US008468580B1

(12) United States Patent
Casey et al.

(10) Patent No.: US 8,468,580 B1
(45) Date of Patent: Jun. 18, 2013

(54) SECURE COMMUNICATION BETWEEN TRUSTED PARTIES

(75) Inventors: Brandon J. Casey, San Jose, CA (US); Erik Cressall, San Jose, CA (US)

(73) Assignee: Apple Inc., Cupertino, CA (US)

( * ) Notice: Subject to any disclaimer, the term of this patent is extended or adjusted under 35 U.S.C. 154(b) by 603 days.

(21) Appl. No.: 12/544,950

(22) Filed: Aug. 20, 2009

(51) Int. Cl.
*G06F 21/00* (2006.01)

(52) U.S. Cl.
USPC .................................. 726/4; 726/29; 709/206

(58) Field of Classification Search
USPC ....................... 726/4, 29; 709/206; 705/57–59
See application file for complete search history.

(56) References Cited

U.S. PATENT DOCUMENTS

| 5,953,710 | A | 9/1999 | Fleming |
| 6,609,113 | B1 | 8/2003 | O'Leary et al. |
| 6,658,568 | B1 * | 12/2003 | Ginter et al. ................ 713/193 |
| 6,728,378 | B2 * | 4/2004 | Garib ............................ 380/259 |
| 6,749,114 | B2 | 6/2004 | Madani |
| 6,903,681 | B2 | 6/2005 | Faris |
| 7,249,092 | B2 | 7/2007 | Dunn et al. |
| 7,290,278 | B2 * | 10/2007 | Cahill et al. ....................... 726/6 |
| 7,331,518 | B2 | 2/2008 | Rable |
| 7,333,947 | B2 | 2/2008 | Wiebe et al. |
| 7,357,310 | B2 | 4/2008 | Calabrese et al. |
| 7,721,092 | B2 * | 5/2010 | Ohkoshi et al. ............... 713/168 |
| 8,060,916 | B2 * | 11/2011 | Bajaj et al. ........................ 726/3 |
| 8,214,649 | B2 * | 7/2012 | Wood ............................ 713/182 |
| 2001/0037315 | A1 * | 11/2001 | Saliba et al. ..................... 705/70 |
| 2002/0082995 | A1 | 6/2002 | Christie, IV |
| 2003/0028481 | A1 | 2/2003 | Flitcroft et al. |
| 2003/0055785 | A1 * | 3/2003 | Lahiri ............................. 705/41 |
| 2003/0083933 | A1 * | 5/2003 | McAlear ........................ 705/14 |
| 2003/0135463 | A1 | 7/2003 | Brown |
| 2004/0034598 | A1 | 2/2004 | Robinson |
| 2004/0068448 | A1 * | 4/2004 | Kim ................................ 705/27 |
| 2004/0083394 | A1 | 4/2004 | Brebner |
| 2004/0260607 | A1 * | 12/2004 | Robbins et al. ................ 705/14 |
| 2005/0044197 | A1 * | 2/2005 | Lai ................................ 709/223 |
| 2005/0085504 | A1 * | 4/2005 | Nelson et al. ................ 514/310 |
| 2005/0086504 | A1 * | 4/2005 | You et al. ...................... 713/193 |
| 2005/0246278 | A1 | 11/2005 | Gerber et al. |
| 2006/0006226 | A1 | 1/2006 | Fitzgerald et al. |

(Continued)

FOREIGN PATENT DOCUMENTS

| EP | 1696626 | 8/2006 |
| JP | 2007323613 | 12/2007 |

OTHER PUBLICATIONS

U.S. Appl. No. 12/544,935, filed Aug. 20, 2009, Casey et al.
U.S. Appl. No. 12/544,944, filed Aug. 20, 2009, Casey et al.

(Continued)

*Primary Examiner* — Andy Rao
*Assistant Examiner* — Shan Elahi
(74) *Attorney, Agent, or Firm* — Novak Druce Connolly Bove + Quigg LLP (57) ABSTRACT

The present disclosure provides for the establishment of a trust relationship between two parties, such as based on verification by a third-party known to the two parties. In one embodiment, the two parties may include an electronic device (or a user of such a device) on which information about an account is to be stored and an entity having the authority to authorize storing the account information on the electronic device. Once authorization is granted to store the account information on the electronic device, direct communications may occur between the electronic device and the authorizing entity in a trusted manner, without further involvement of the third party.

16 Claims, 9 Drawing Sheets

U.S. PATENT DOCUMENTS

| | | | |
|---|---|---|---|
| 2006/0010042 A1 | 1/2006 | Gianakis et al. | |
| 2006/0031162 A1 | 2/2006 | Brundage et al. | |
| 2006/0046692 A1* | 3/2006 | Jelinek et al. | 455/411 |
| 2006/0069926 A1* | 3/2006 | Ginter et al. | 713/194 |
| 2006/0074698 A1 | 4/2006 | Bishop et al. | |
| 2006/0085357 A1 | 4/2006 | Pizarro | |
| 2006/0105742 A1 | 5/2006 | Kim et al. | |
| 2006/0131390 A1* | 6/2006 | Kim | 235/380 |
| 2006/0167823 A1* | 7/2006 | York et al. | 705/76 |
| 2007/0016527 A1* | 1/2007 | Lyons | 705/44 |
| 2007/0118475 A1 | 5/2007 | Picciallo et al. | |
| 2008/0006685 A1 | 1/2008 | Rackley, III et al. | |
| 2008/0010190 A1 | 1/2008 | Rackley, III et al. | |
| 2008/0010191 A1 | 1/2008 | Rackley, III et al. | |
| 2008/0010193 A1 | 1/2008 | Rackley, III et al. | |
| 2008/0010204 A1 | 1/2008 | Rackley, III et al. | |
| 2008/0016232 A1 | 1/2008 | Yared | |
| 2008/0027844 A1 | 1/2008 | Little et al. | |
| 2008/0040265 A1 | 2/2008 | Rackley, III et al. | |
| 2008/0078831 A1 | 4/2008 | Johnson et al. | |
| 2008/0108324 A1 | 5/2008 | Moshir | |
| 2008/0126145 A1 | 5/2008 | Rackley | |
| 2008/0162346 A1 | 7/2008 | Aaron | |
| 2008/0166998 A1 | 7/2008 | Sun et al. | |
| 2008/0207203 A1 | 8/2008 | Arthur et al. | |
| 2008/0208743 A1 | 8/2008 | Arthur | |
| 2008/0229430 A1* | 9/2008 | Kargman | 726/28 |
| 2009/0098854 A1 | 4/2009 | Park | |
| 2009/0098906 A1* | 4/2009 | Benner et al. | 455/553.1 |
| 2009/0327142 A1* | 12/2009 | Shao et al. | 705/75 |

OTHER PUBLICATIONS

U.S. Appl. No. 12/351,687, filed Jan. 9, 2009, Casey et al.
U.S. Appl. No. 12/351,649, filed Jan. 9, 2009, Casey et al.
U.S. Appl. No. 12/351,714, filed Jan. 9, 2009, Casey et al.
U.S. Appl. No. 12/351,724, filed Jan. 9, 2009, Casey et al.
U.S. Appl. No. 12/351,674, filed Jan. 9, 2009, Casey et al.
Ilium Software, "Users Guide and Reference: Version 6.1," Jul. 2008 (available electronically at: www.iliumsoft.com/dl/doc/eWallet.pdf (accessed Apr. 9, 2009)).
Gridlock Manual, "Gridlock v.1.32", published Oct. 13, 2008, 6 pgs., found at http://www.pdabusiness.com/gridlock/manual/manual.html.

* cited by examiner

SECURE COMMUNICATION BETWEEN TRUSTED PARTIES

BACKGROUND

The present disclosure relates generally to communication between known or trusted sources using an electronic device, such as a handheld or portable device. This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as notebook computers, cellular telephones, personal digital assistants (PDAs), and so forth, are commonly used to exchange various types of electronic communications. Due to the ease and low cost of sending electronic communications, such as e-mails and text messages, these types of communications have rapidly expanded, in some instances inundating individuals with both authorized messages as well as unsolicited (and often undesired) messages. As a result, a person may miss or accidentally disregard e-mails or messages that they might otherwise be interested in reading.

In addition, in some instances illegal or illicit enterprises may employ electronic messages in attempts to acquire information from an individual for improper purposes. In such instances, the entity attempting to acquire the information may create electronic messages which appear to be from an entity with which a person normally interacts or with whom they might normally provide such information. As a result, an individual runs two risks: responding to a message to which he or she should not respond, or disregarding an authentic or valid message which cannot be distinguished from an illicit or undesired message.

Thus an individual's inability to easily distinguish between those messages which are of interest from those which are not of interest may pose a variety of problems for an individual. Namely, an individual may inadvertently miss messages of actual import or interest, such as messages from a financial institution or store with which the individual does business. Alternatively, an individual may waste time on unsolicited messages, or may disclose sensitive information to unauthorized parties, by failing to discard or disregard messages that are not from an institution that they appear to be from.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to providing communication between trusted parties. For example, a trust relationship may exist when two parties have an existing and verifiable relationship, such as where a user's account or other information is stored on an electronic device based upon a prior approval granted by an institution associated with the account, e.g., an account issuer. In such an example, a third party with an existing relationship with both the account holder and the account issuer may facilitate establishment of the trust relationship. In particular, a third party may serve as an intermediary to establish the identity of each party during the process of storing the account information on the electronic device and acquiring the initial approval for such storage.

Once the parties' identities are established, such as once the account holders' account information is stored on an electronic device, communications between the electronic device and account issuer may be streamlined in view of the existing relationship between the electronic device and the account issuer. In particular, communications made between the electronic device and the account issuer may be deemed trusted so that a user of the electronic device, such as the account holder, can identify the communications as coming from a trusted source, such as the account issuer.

For example, a user having bank account information stored on an electronic device after approval by the associated bank may be able to ascertain that messages received on the electronic device that allege to be from the bank are actually from the bank. Likewise, messages initiated at the electronic device and sent to the bank (or other appropriate institution) may be trusted at the bank as having come from the owner of the electronic device. In some embodiments, the trust relationship may be leveraged to allow searching or other interactive communications between the trusted parties.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques allow for secure communication between two trusted parties based upon authenticated information stored on an electronic device. Examples of such information may include bank account or credit card information (as well as other types of financial information) as well as membership, gift, or debit card information associated with a store or other commercial entity (e.g., a merchant). Such information may be initially placed on an electronic device after authentication by the relevant commercial or financial entity. Subsequently, communications made between the user of the device and the commercial or financial entity may be deemed trusted such that each party knows that the communications are authentic, i.e., from the trusted party.

Figure 1:
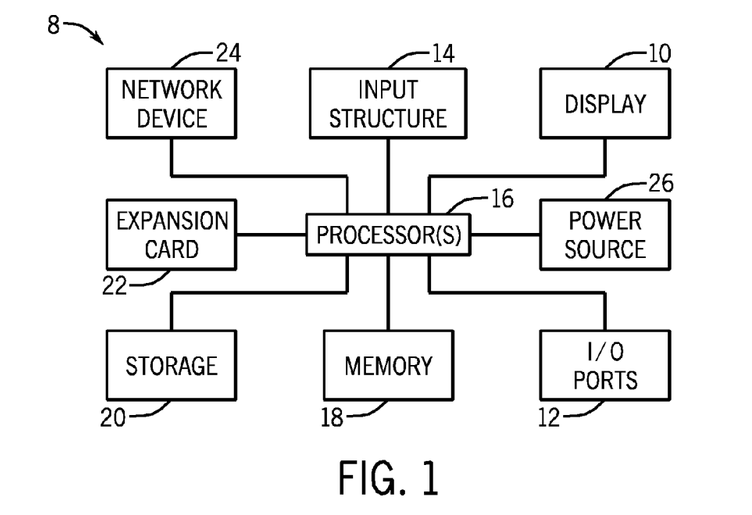
FIG. 1 is a block diagram of exemplary components of an electronic device, in accordance with aspects of the present disclosure.
Figure 2:
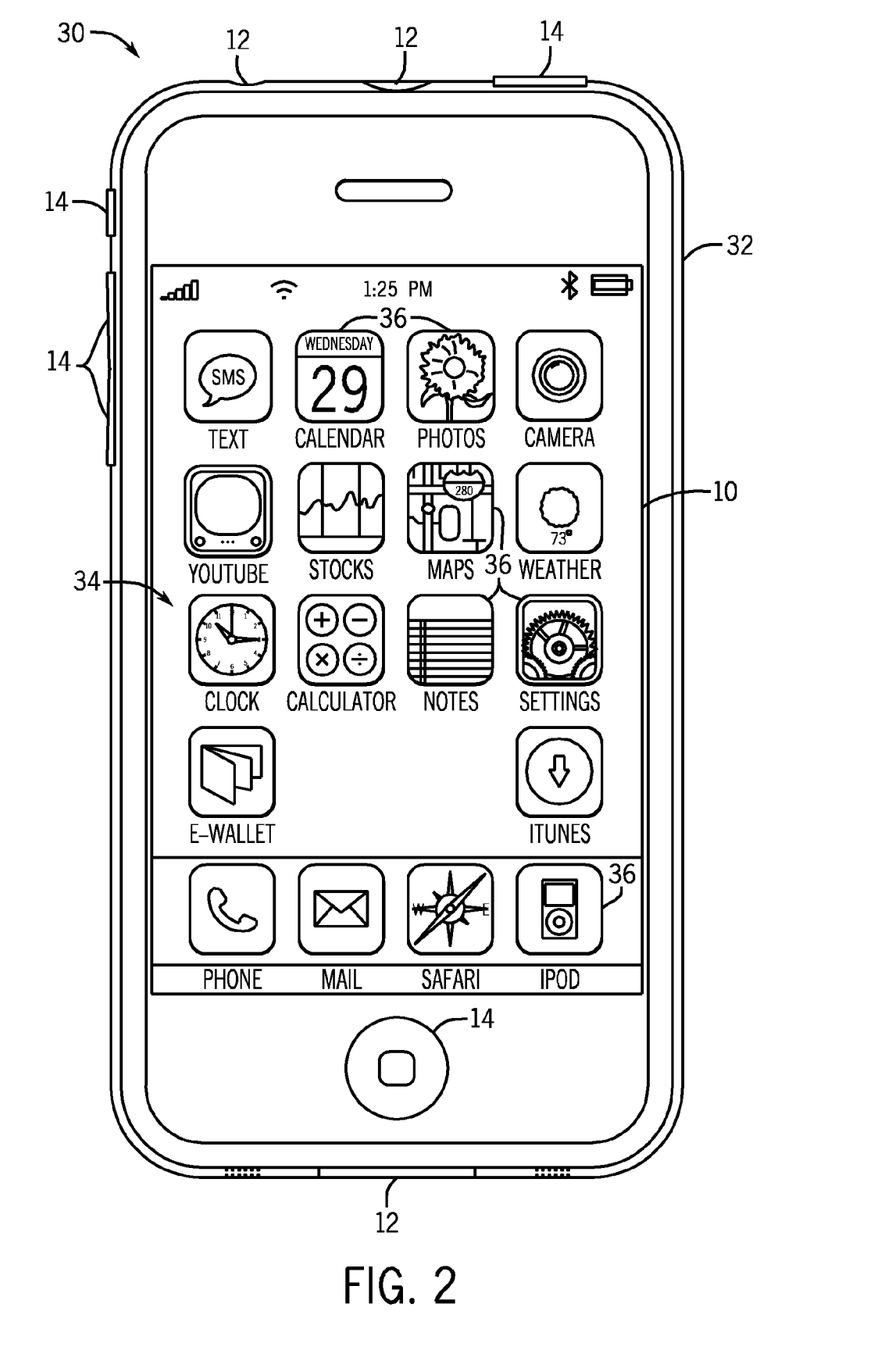
FIG. 2 is a front view of a handheld electronic device in accordance with aspects of the present disclosure.
Figure 3:
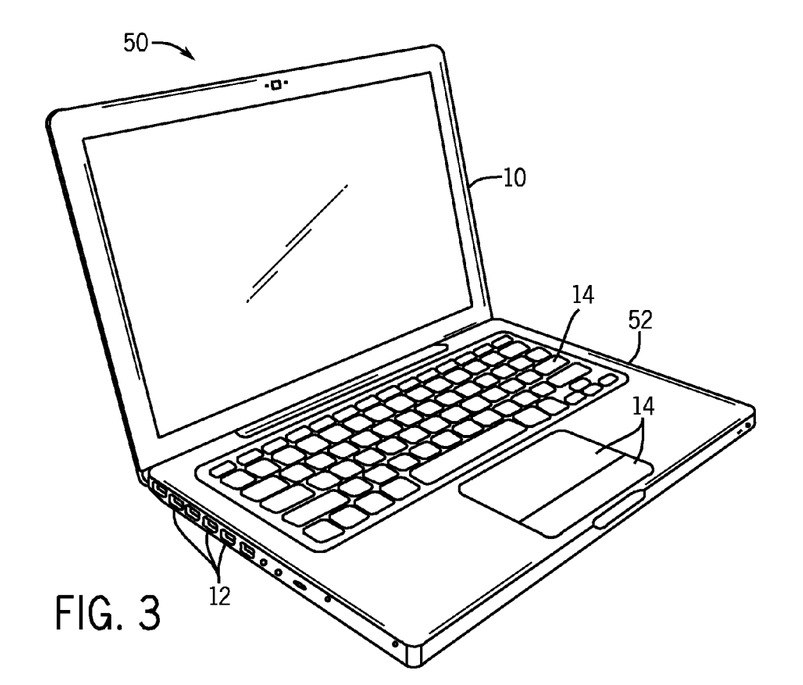
FIG. 3 is a view of a computer for use in accordance with aspects of the present disclosure.

With these foregoing features in mind, a general description of suitable electronic devices for implementing aspects of the present techniques is provided. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing suitable storage and/or processing capabilities, may be used in conjunction with the present techniques.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein. As will be appreciated, the various functional blocks shown in FIG. 1 may include hardware elements (including application specific or generic circuitry), software elements (including computer code stored on a machine-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, data processing circuitry, such as one or more processors 16, a memory device 18, a non-volatile storage 20, expansion card(s) 22, a networking device 24, and a power source 26.

With regard to each of these components, the display 10 may be used to display various images generated by the device 8. The display 10 may be any type of display such as a cathode ray tube (CRT), a liquid crystal display (LCD), a light emitting diode (LED) display, an organic light emitting diode (OLED) display, or other suitable display. In certain embodiments of the electronic device 8, the display 10 may include a touch-sensitive element, such as a touch screen.

The I/O ports 12 may include ports configured to connect to a variety of external devices, such as a power source or other electronic devices (such as handheld devices and/or computers, printers, projectors, external displays, modems, docking stations, and so forth). The I/O ports 12 may support any standard or proprietary interface type, such as a universal serial bus (USB) port, a video port, a serial connection port, a IEEE-1394 port, an Ethernet or modem port, and/or an AC/DC power connection port.

The input structures 14 may include the various devices, circuitry, and pathways by which input or feedback is provided to data processing circuitry, such as the processor 16. Such input structures 14 may be configured to control a function of the device 8 when actuated. For example, the input structures 14 may include buttons, sliders, switches, control pads, keys, knobs, scroll wheels, keyboards, mice, touchpads, and so forth. In certain embodiments, the input structures 14 may also include such components as global positioning system (GPS) circuitry and/or accelerometers that convey information about the location and/or orientation of the device 8 to the processors 16.

In certain embodiments, an input structure 14 and display 10 may be provided together, such an in the case of a touch screen where a touch sensitive mechanism is provided in conjunction with the display 10. In such embodiments, the user may select or interact with displayed interface elements via the touch sensitive mechanism. In this way, the displayed user interface may provide interactive functionality, allowing a user to select, by touch screen or other input structure, from among options displayed on the display 10.

User interaction with the input structures 14, such as to interact with a user or application interface displayed on the display 10, may generate electrical signals indicative of the user input. These input signals may be routed via suitable pathways, such as an input hub or bus, to data processing circuitry, such as the processor(s) 16, for further processing.

The processor(s) 16 may provide data processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a memory 18. The memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware executed by a processor 16 (such as basic input/output instructions or operating system instructions), other programs or code that enable various functions of the electronic device 8 (such as E-wallet and trusted message or communication functions as described herein), user interface functions, processor functions. In addition, the memory 18 and may be used for buffering or caching during operation of the electronic device 8.

The components may further include a non-volatile storage 20 for persistent storage of data and/or instructions. The non-volatile storage 20 may include flash memory, a hard drive, or any other optical, magnetic, and/or solid-state storage media. The non-volatile storage 20 may be used to store data files such as personal or business information (e.g., financial and other account information), software, wireless connection information (e.g., information that may enable the electronic device 8 to establish a wireless connection, such as a telephone or wireless network connection), and any other suitable data. The non-volatile storage 20 may provide storage for code and/or data for implementing various functions of the electronic device 8, such as application or program code, data associated with such applications or programs, operating system code, user configured preferences, as well as code for implementing secure communications as discussed herein.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable standard or proprietary connector, and may be accessed internally or external to the housing of the electronic device 8. For example, in one embodiment, the expansion card 22 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), cellular network, or the Internet. Further, the electronic device 8 may connect to and send or receive data with a suitable device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone, that may be used to store authenticated account information and/or to execute routines to facilitate secure communication using the device 30. It should be noted that while the depicted handheld device 30 is provided in the context of a cellular telephone, other types of handheld devices (such as media players for playing music and/or video, personal data organizers, handheld game platforms, and/or combinations of such devices) may also be suitable be provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the generalized electronic device of FIG. 1, the handheld device 30 may allow a user to connect to and communicate through the Internet or through other networks, such as local or wide area networks or cellular networks. For example, the handheld device 30 may allow a user to communicate using e-mail, text messaging, instant messaging, or other forms of electronic communication. The handheld electronic device 30, may also communicate with other devices using short-range connections, such as Bluetooth and near field communication. By way of example, the handheld device 30 may be a model of an iPod® or iPhone®, or a derivative thereof, available from Apple Inc. of Cupertino, Calif.

In the depicted embodiment, a housing 32 includes input structures 14 through which a user may interface with the device. Each input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

A display 10 of the handheld device 30 may be used to display a graphical user interface (GUI) 34 that allows a user to interact with the handheld device 30. The GUI 34 may include various layers, windows, screens, templates, or other graphical elements that may be displayed in all, or a portion, of the display 10. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen provided as the display 10 in certain embodiments, or may be selected by a user input structure 14, such as a wheel or button.

In addition, the handheld device 30 may include data processing circuitry (such as one or more processors), network connectivity, memory, and storage capabilities, as described with respect to FIG. 1, which allow the handheld device 30 to store and execute the GUI or other applications suitable for implementing the present techniques. For example, the handheld device 30 may be capable of storing and executing code suitable for allowing trusted communication between a user of the device 30 and an authenticating and/or authenticated entity. Further, to the extent that the handheld device 30 has network connectivity, such connectivity may be utilized to update or modify an existing application or GUI on the handheld device 30 to provide such functionality, i.e., to update an operating system or software application to allow trusted communication between authenticated entities via the handheld device 30.

In addition to handheld devices 30, such as the depicted cellular telephone of FIG. 2, an electronic device 8 may also take the form of a computer or other types of electronic device on which account or other authenticated information might be stored and on which software code governing trusted communications based on the presence of such information might be executed. Such computers may include computers that are generally portable (such as laptop, notebook, and tablet computers) as well as computers that are generally used in one place (such as conventional desktop computers, workstations and/or servers). In certain embodiments, the electronic device

8 in the form of computer may be a model of a MacBook®, MacBook® Pro, MacBook Air®, iMac®, Mac® mini, or Mac Pro® available from Apple Inc.

By way of example, an electronic device 8 in the form of a laptop computer 50 is illustrated in FIG. 3 in accordance with one embodiment. The depicted computer 50 includes a housing 52, a display 10, input structures 14, and input/output ports 12. The input structures 14 (such as a keyboard and/or a touchpad) may be used to interact with the computer 50, such as to start, control, or operate a GUI or applications running on the computer 50. For example, a keyboard and/or touchpad may allow a user to navigate a user interface or application interface displayed on the display 10. In addition, the input and output ports 12 may allow connection of additional devices. For example, the computer 50 may include an I/O port 12, such as a USB port or other port, suitable for connecting to another electronic device, such as a handheld electronic device 30.

In addition, as discussed with respect to the handheld device 30, the computer 50 may include data processing circuitry (such as one or more processors), network connectivity, memory, and storage capabilities that allow the computer 50 to store and execute a GUI and other applications suitable for implementing the present techniques. For example, the computer 50 may be capable of storing and executing programming code encoding routines suitable for implementing trusted communications as discussed herein. Further, to the extent that a computer 50 has network connectivity, such connectivity may be utilized to update or modify an existing application on the computer 50 to provide such functionality.

With the foregoing discussion in mind, it may be appreciated that an electronic device 8 in either the form of a handheld device 30 or a computer 50 may be suitable for storing authenticated information and providing trusted communications as described herein. Though specific examples of the use of one type of electronic device or another might be described or discussed herein as providing such trusted communications, such discussion is intended as an example only and should not be construed as limiting or as indicative of a preference of one implementation over another. Instead, it should be understood that any suitable electronic device 8 (whether a portable electronic device 30, computer 50, or other type of device) capable of storing authenticating information, and transmitting or receiving messages may be used to perform these respective functions in the various implementations described herein.

Figure 4:
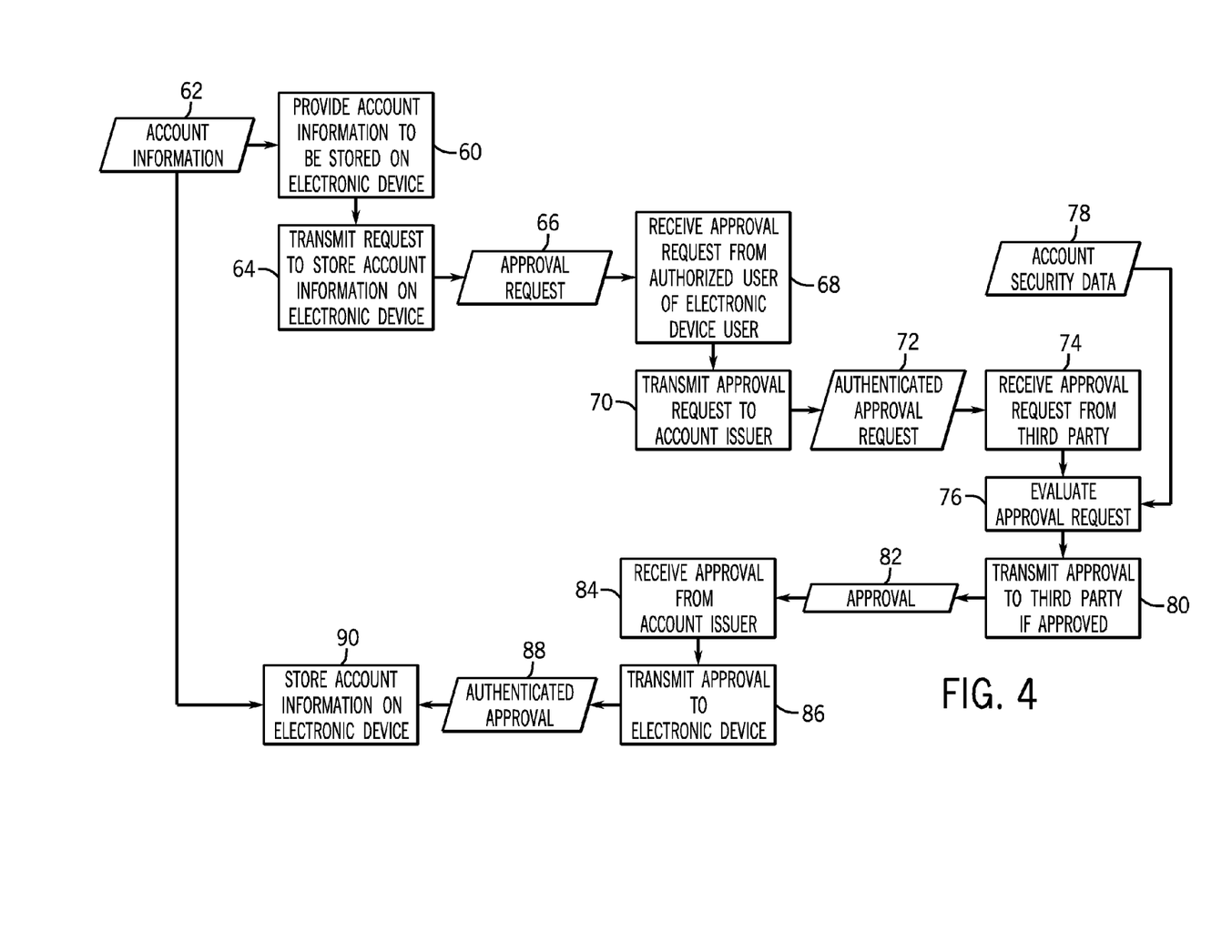
FIG. 4 is a flowchart depicting actions that may be performed in establishing a trust relationship in accordance with aspects of the present disclosure.

For example, in one implementation, code stored and/or executed on a handheld device 30 or computer 50 may be used to implement trusted communication between previously authenticated parties as discussed herein. Turning to FIG. 4, a flowchart depicts representative acts, inputs, and outputs associated with one embodiment in which such trusted communication is implemented. As depicted in FIG. 4, an account holder may provide (block 60) account information 62 (such as credit, bank, or debit card information) to be stored or synchronized on a target electronic device. In one embodiment, the account information 62 may be provided or input directly onto a suitable electronic device 8, such as a handheld electronic device 30. In other embodiments, the account information 62 may be provided on an electronic device that is not the target electronic device on which the account information 62 is to be stored. For example, the account information may be entered or provided to an application running on a computer 50, which may connect to a handheld electronic device 30 to allow the application to store and/or maintain (i.e., synchronize) information (such as the account information 62) on the handheld electronic device 30.

Based upon entry of the account information 62, a request 66 for approval may be transmitted (block 64) to a trusted third party. In one embodiment, the third party may be a manufacturer of the electronic device on which the account information 62 is to be stored or may be a distributor of a software application used to store such account information 62 on an electronic device, such as a handheld electronic device 30. For example, in one implementation an application used to synchronize content on a media player or cellular telephone (such as the iTunes® application available from Apple Inc. of Cupertino, Calif.) may be used to enter the account information 62 and may transmit the approval request 66 to a known third party.

Upon receipt (block 68) of the approval request, the third party may confirm that the electronic device making the request and/or on which the account information 62 is to be stored is recognized. That is, the third party may authenticate the identity of the target electronic device or an authorized user of the electronic device as part of the approval process. Such authentication may be based on information identifying one or more of the hardware components of the target electronic device which may be compared to stored records regarding the target electronic device or a user of the target electronic device. The authentication may also include some form of login with user provided authentication, such as a password or personal identification number (PIN), that serves to authenticate the user of the target electronic device.

Once the third party establishes to its satisfaction that the target electronic device and/or user of the target electronic device are known, the third party may transmit (block 70) the authenticated approval request 72 to an issuing entity (e.g., a bank, credit card company, merchant, and so forth) or other party with approval authority over the account information 62 to be stored on the target electronic device. That is, in one embodiment the entity that can approve or disapprove the storage of the account information 62 on the target electronic device receives (block 74) the authenticated approval request 72. For example, in one embodiment an issuing bank, merchant, or other account issuing entity may receive the authenticated approval request 72 if the account information 62 to be stored relates to an account issued and/or maintained by the bank, merchant or other issuing entity.

The party with approval authority may evaluate (block 76) the authenticated approval request 76 to determine whether to approve or reject the authenticated approval request 72. For example, data 78 related to the account (such as security settings or restrictions on the account, account limits, account history, and so forth) may be evaluated to determine whether the authenticated approval request 72 should be approved or rejected. If approved, an approval message 82 may be transmitted (block 80) to the third party. If rejected, a rejection may be transmitted or no other action may be taken.

In one embodiment, upon receiving (block 84) the approval 82, the third party may authenticate the communication from the approving party, such as via a transaction number or certificate associated with the approval 82. Alternatively, in certain embodiments, the communication between the third party and the approving party may be over a dedicated or secured channel such that communications received over the channel are known to be authentic. If the approval 82 is determined to be authentic, the third party may transmit (block 86) the authenticated approval 88 (or an approval code) to the target electronic device or to an application in communication with the target electronic device. Upon receipt of the authenticated approval or approval code, the account information 62 (e.g., credit, bank, or debit card information) may be stored (block 90) to the target electronic device. In one embodiment, the target electronic device may then have direct and secure communication channel with the authorizing entity based upon the account information stored on the electronic device with the authorizing entity's approval. That is, the authorizing entity and the electronic device are authenticated to one another after the approval process.

Figure 5:
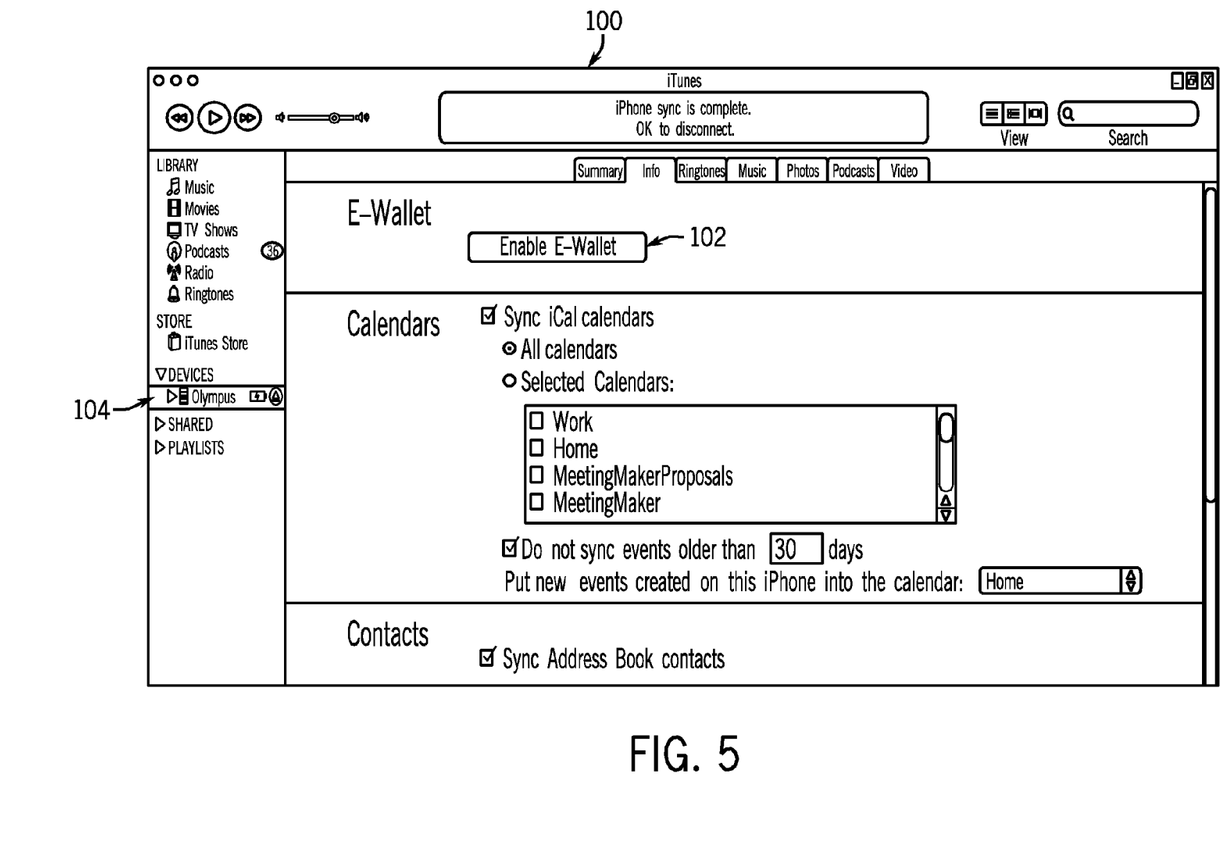
FIG. 5 is a screenshot of a synchronization application using three-party verification in accordance with aspects of the present disclosure.
Figure 6:
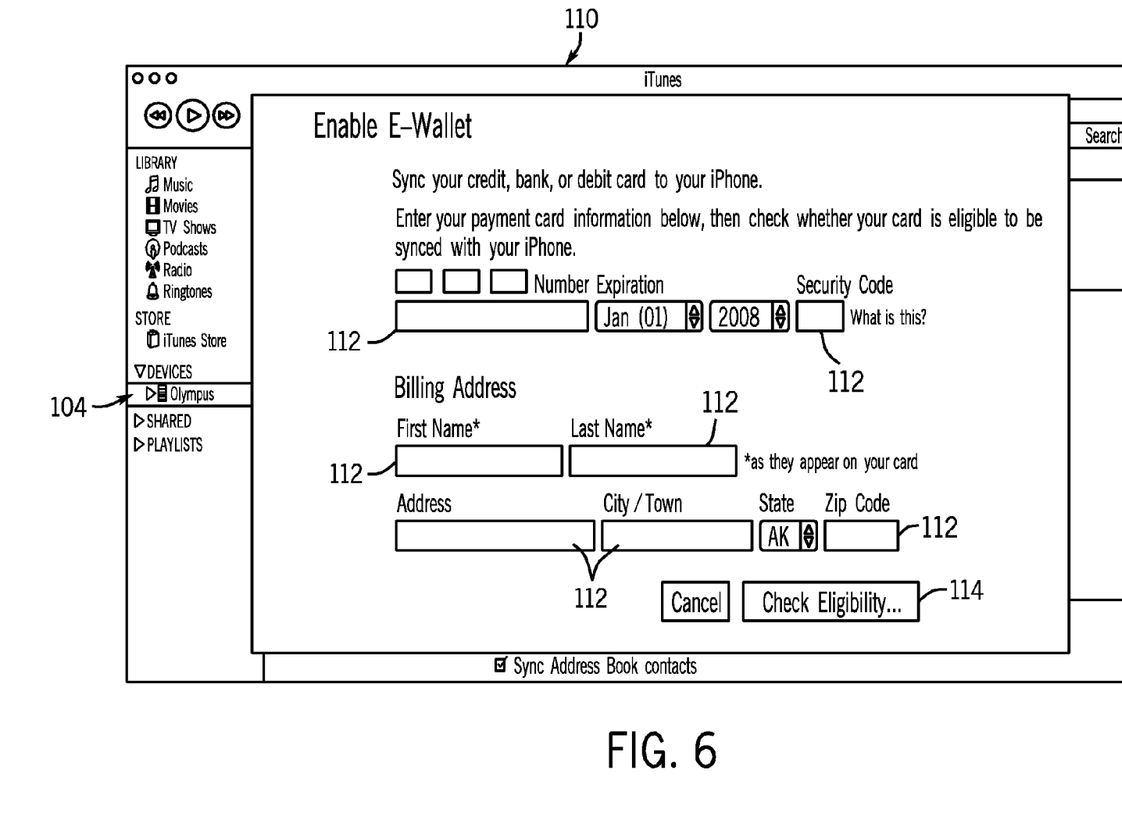
FIG. 6 is a screenshot of a data entry screen of a synchronization application in accordance with aspects of the present disclosure.
Figure 7:
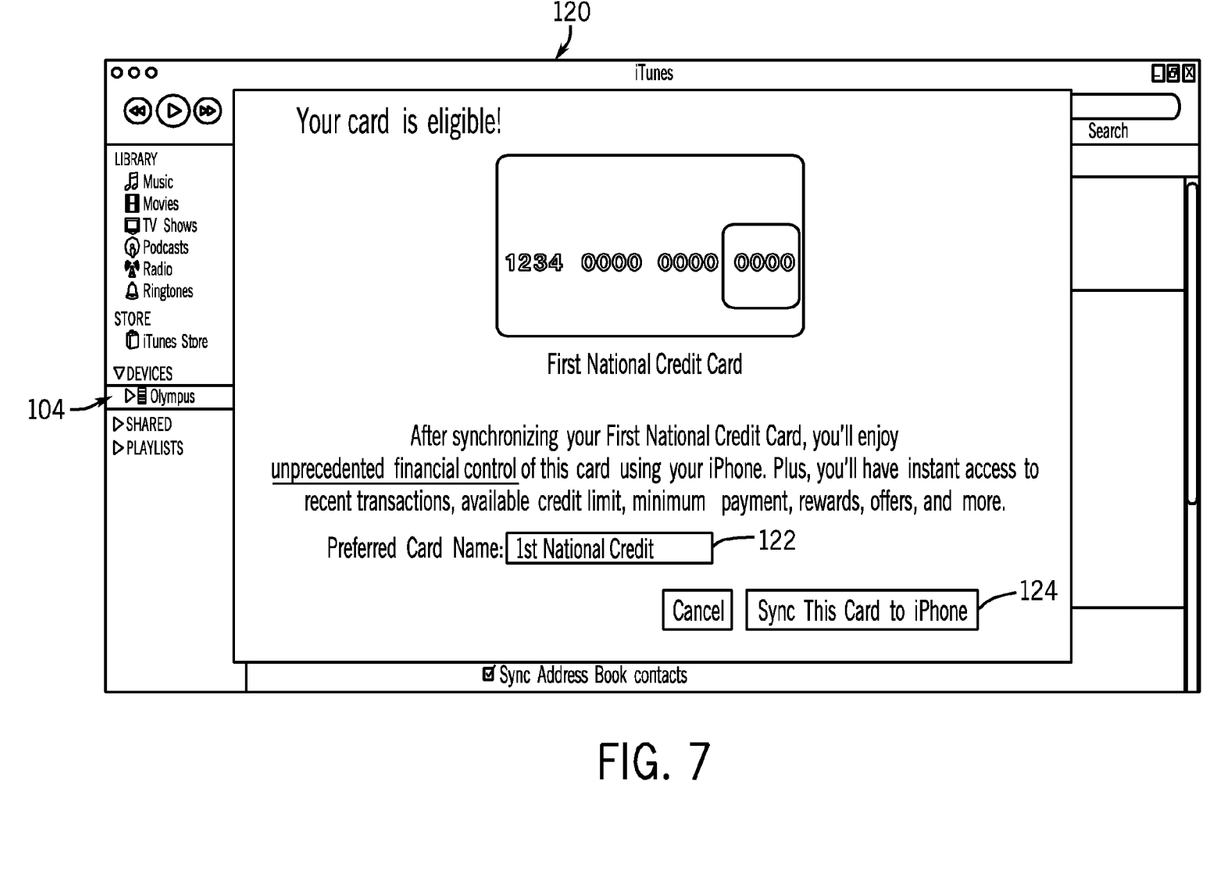
FIG. 7 is a screenshot of an eligibility screen of a synchronization application in accordance with aspects of the present disclosure.

By way example, one possible implementation of the authentication and storage process is provided in the context of FIGS. 5-7. In this example, a software program stored and/or executed on a laptop or desktop computer system may be used to initially store and/or maintain suitable account information 62 on a portable electronic device, such as a cellular telephone or MP3 player in communication with the computer. In other embodiments the software program may be stored and/or executed on the portable electronic device, i.e., the target device on which the account information will be stored, itself. In one implementation, the iTunes® application, available from Apple Inc., may provide functionality to store and/or manage account information on a handheld electronic device, such as an iPod® or iPhone®, also available from Apple Inc. Such functionality may be provided in the application when initially downloaded or via a periodic update providing new functionality to the application.

Turning to FIG. 5, an example of a screen 100 from an application providing such functionality is provided. In accordance with this screen 100, a selectable option is provided in the form of a clickable button 102 of the application GUI. The button 102 enables storing account information on a target device 104 being synchronized using the application. In certain embodiments, the device 104 may be a portable electronic device 30 running the application itself or connected to a computer 50 or other electronic device that is running the application. In other embodiments, the device 104 may be a computer, such as a laptop or desktop computer, running the application or in communication with another electronic device that is running the application.

The account information 62 to be set up or maintained on the target device 104 may be of various sorts that may be desirable to store and/or access on the device 104. For example, the account information may be an account number and/or additional account details for a financial account, such as a credit card, a debit card, a pre-paid card, a store loyalty card, a membership card (such as a gym or warehouse retailer card), a bank account, a brokerage account, a retirement account, and so forth. In certain embodiments, such account information may be used to make on-line or in-person purchases using the device 104 or to otherwise utilize or manage the various accounts for which information is being stored.

Turning to FIG. 6, a screen 110 invoked by the selection of button 102 is depicted. The screen 110 provides data entry fields 112 for the entry of information identifying or authenticating the account information 62 to be stored or maintained on the device 104. In the depicted embodiment, the provided data entry fields 112 correspond to information associated with a credit card account. For other types of accounts, other appropriate data entry fields (such as for routing numbers, PINs, and so forth) may be provided. In one implementation, a user provides the requested information in the data entry fields 112. After the requested information is provided, the user may select an option provided in the form of a clickable button 114 of the application GUI. In the depicted implementation, the button 114, when selected, initiates a routine or algorithm to determine whether the provided account information 62 may be stored or updated on the device 104.

For example, in one embodiment, the button 114 initiates routines that communicate an approval request 66 with a third party (such as a manufacturer of the device 104 or a distributor of the application) trusted capable of authenticating the device 104 and/or the known user(s) of the device 104. In one embodiment, the third party may then communicate with an entity authorized to approve or disapprove storage of the account information 62 on the device 104, such as the party that issues or maintains the account associated with the account information 62, as previously discussed. Examples of some criteria that may be evaluated upon selection of the button 114 include the status of the account (i.e., expired, delinquent, current, stolen, and so forth), the accuracy of the provided data (i.e., does the security code and/or the billing address, match the account information), and whether the account is authorized for use on the device 114 per an agreement between the account holder and the authorizing party, e.g., the account issuer.

If the account information 62 is approved for storage on the device 104, a screen 120 (FIG. 7) may be displayed indicating that the account information 62 may be stored on the device 104. In one implementation, the screen 120 includes an entry field 122 in which the user may enter a name by which the account will be known on the device 104. In addition, the user may select an option provided in the form of a clickable button 124 of the application GUI. In the depicted implementation, the button 124, when selected, acts to store or update the account information 62 on the device 104. In certain embodiments, the information for more than one account may be stored on a device 104.

In one embodiment, the information stored or updated on the device 104 is the actual account information, such as the account number, in either a raw or encrypted form. In some embodiments a unique identifier that is different from the account number, such as a hash of the account number or a unique alphanumeric identifier provided by the account issuing and/or authorizing institution, may instead be stored on the device 104. In such an embodiment, the institution approving usage of the account information 62 on the device 104 (such as the institution issuing or managing the account or card) may be able to associate the hash or the unique identifier with the account even though the actual account number is not stored on the device 104. In this manner, a user of the device 104 may engage in a transaction using the hash or assigned identifier stored on the device 104 and the authorizing institution may recognize the hash or identifier as being associated with the account in question and process the transaction accordingly.

Figure 8:
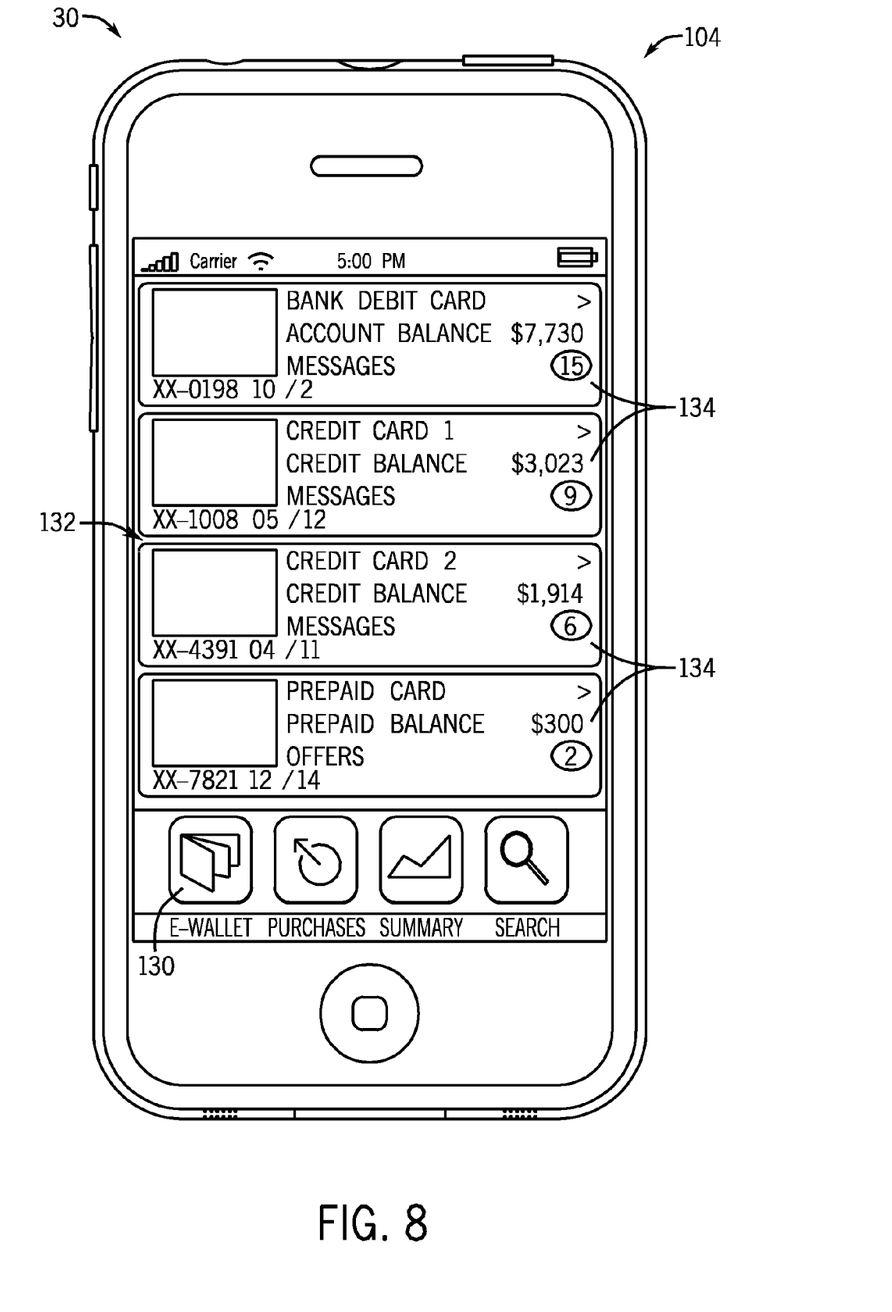
FIG. 8 is a front view of a handheld electronic device displaying account information in accordance with aspects of the present disclosure.

Once the account information 62 is stored on the device 104, a user of the device 104 may use and/or view the account information 62 on the device 104. For example, as depicted in FIG. 8, the device 104, depicted as a handheld electronic device 30 in the form of a cellular telephone, may have a selectable "E-Wallet" icon 130 or similar icon or button displayed on a screen 132. Once selected, the "E-Wallet" icon 130 may bring up a display of the various accounts 134 for which information is stored on the device 104. In addition, other account specific information such as balance, statement date, interest rate, and so forth may also be displayed. In addition, as discussed in greater detail below, messages to or from an account issuing institution may be displayed when viewing details of the account. Individual accounts 134 may be selected on screen 132 for use in an online or in-store purchase using the device 104 or to obtain additional information related to the account, such as balance, purchase history, pending transactions, interest rate, alerts, offers, and so forth.

While the present discussion is generally provided in the context of a device 104 on which account information 62 is stored that is separate from the electronic device running the synchronization application, it should be appreciated that this may not be the case. For example, in embodiments where the device 104 on which the account information 62 is stored is itself capable of running the synchronization application (such as iTunes® in certain embodiments) the synchronization application may be run on the same platform which stores the account information 62.

Further, while certain embodiments envision the device 104 which stores the account information 62 as being a handheld electronic device 30, such as a cellular telephone or media player, in other embodiments the device 104 may be something other than a handheld device, such as a laptop or desktop computer 50. In addition, the synchronization application may be run from any suitable processor based system, portable or otherwise, without respect to the size of such system.

In one embodiment, an electronic device on which account information 62 is stored may be able to engage in direct, trusted communication with an issuing or authorizing entity associated with the account information 62 after the initial three-party verification process is completed. For example, the approval of and presence of the account information 62 on the target electronic device may be used to allow the electronic device and the issuing entity to engage in direct, authenticated communications, i.e., the parties may be able to authenticate themselves to one another, without additional third party involvement. For example, as part of the three-party verification process a token or certificate-based authentication process may be implemented for subsequent communications between the electronic device and the approving entity such that a token or certificate stored on the electronic device and/or at the approving entity is utilized for authentication of subsequent communications. Likewise, hardware, software, or user information specific to the electronic device may be conveyed during the initial three-party verification such that subsequent communications leverage such device-specific information in authenticating subsequent communications. Thus, in certain embodiments, after the initial three party verification the electronic device (or an authenticated user logged into such an electronic device) and the approving entity may exchange communications directly with one another (i.e., without involving the trusted third party) in a secure and trusted manner.

Figure 9:
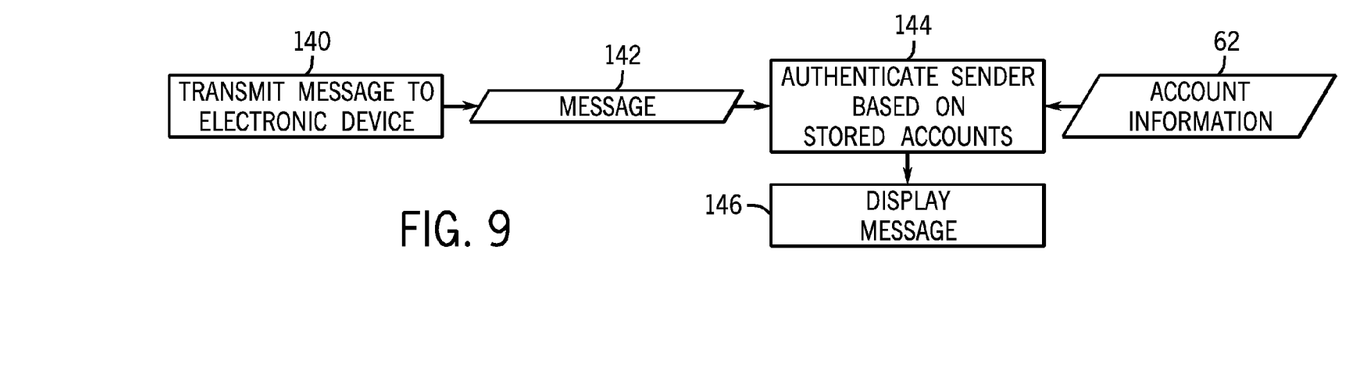
FIG. 9 is a flowchart depicting actions that may be performed in transmitting a message in accordance with aspects of the present disclosure.
Figure 10:
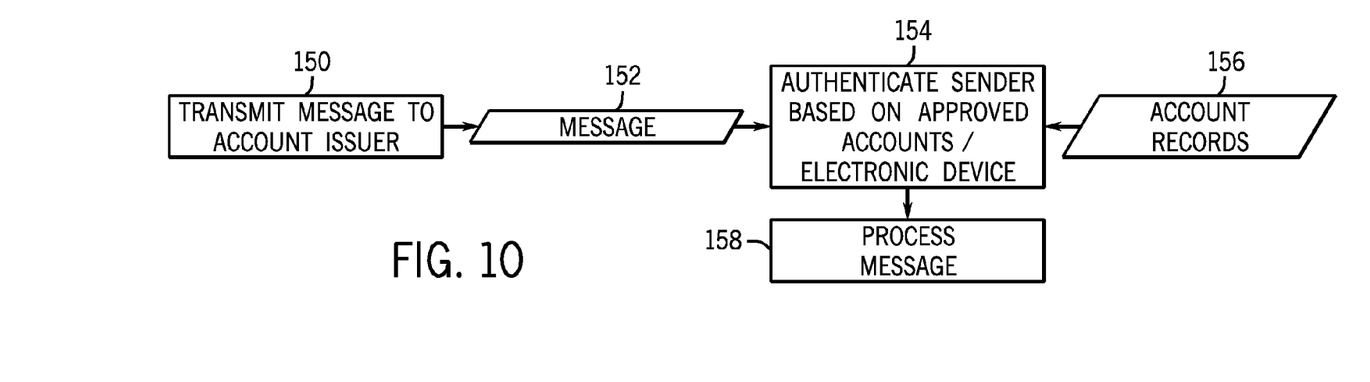
FIG. 10 is a flowchart depicting actions that may be performed in transmitting a message in accordance with further aspects of the present disclosure.

For example, turning to FIGS. 9 and 10, examples of trusted communications between an electronic device and an account issuing or approving entity are depicted by respective flowcharts. As depicted in FIG. 9, a message 142 transmitted from an account issuing entity is transmitted (block 140) to an electronic device. The message 142 may include a notice (such as a notice related to service disruption, an increase in a credit limit, a notice regarding account maintenance or administration, and so forth), an alert (such as an alert that a payment is due or past due, an alert based on purchase or credit activity, or an alert based on other suspicious activity), an offer (such as an offer for a special balance transfer interest rate, offers from stores or merchants offerings discounts for account holders of the account issuing entity, and so forth), a reward, or other communications, including search results or other messages sent in response to communications from the electronic device.

In certain embodiments, trusted communications as discussed herein may occur between the electronic device and a merchant with which the user of the electronic device has an account or does business due to verification of both parties' identities by the three-party verification described herein. In such embodiments, trusted communications may occur between an electronic device and an online merchant may allow the merchant to alert the customer of changes to the customer's online profile (such as billing address, shipping address, email address, password, customer identification and authentication questions and answers, credit card on file, and so forth) or to notify the customer of credit card transaction pending authorization, transactions recently declined, orders recently shipped, and so forth. The secure nature of the communication provides an instant, direct, and trusted communication channel with the merchant, allowing a user of the electronic device to take immediate action, such as to cancel an unauthorized or fraudulent order, in response to the information provided by the merchant. In other embodiments, trusted communications between an electronic device and an online or brick-and-mortar merchant enable the merchant to instantly send the customer a detailed receipt of purchases made by the customer in the store. Because the secure communication channel can be based on previously authenticated customer details, such as the customer's credit card number, the merchant need not prompt the customer for additional personal information in order to electronically deliver a receipt, notice of sale, notice of decline, or other information to the customer.

In some embodiments, as a measure to reduce fraud (especially for more expensive items or when other factors, such as the customer's purchase history (or lack thereof) or the inherent fraud risks of the item purchased, indicate the risk of fraud is high), the merchant may request the customer use the secure communication channel between the merchant and the customer's electronic device to confirm or decline the sale of goods and services before said goods and services are delivered. In still other embodiments, merchants may use the secure communication channel, combined with the customer's preferences for receiving solicitations from the merchant, to send the customer offers targeted to the electronic device's current location, the customer's shopping history, or a shopping list of goods and services the customer is seeking at a given time or in a given location.

Returning now to FIG. 9, as noted above, transmission of the message 142 may include a token, a certificate or information specific to the electronic device that may be used to authenticate (block 144) the message 142 as being from a verified entity, such as the verified account issuer. In one embodiment, the electronic device may verify the authenticity of the message 142 by comparing a token, certificate, or other identifying information included with the message 142 with a reference stored with the respective account information 62 stored on the electronic device. For example, if a message 142 purporting to originate from XYZ Bank is received at the electronic device, the electronic device may determine if account information 62 associated with XYZ bank is stored on the electronic device. If such account information 62 is stored on the electronic device, the appropriate verifying information associated with the account information 62 may be retrieved and used to authenticate the message 142, such as by verifying a token, certificate, or other piece of information provided with the message 142. If the message is authenticated, the electronic device may display (block 146) the message 142 or otherwise make the message available to a user.

Conversely, as depicted in FIG. 10 an electronic device may be used to transmit (block 150) a secure message 152 to an entity issuing or maintaining an account. The message 152 may include a request for information, an update to the account holder's contact or other administrative information, a contest to a pending charge, an electronic payment, and so forth. In one embodiment, the message 152 may include a search request or search terms, such as a search of rates, offers, events, specials, and so forth currently available to the account holder from the account issuer.

As noted above, transmission of the message 152 may include a token, a certificate or information specific to the electronic device that may be used to authenticate (block 154) the message 152 as being from the electronic device or from an authenticated user of the electronic device. In one embodiment, the receiving entity may verify the authenticity of the message 152 by comparing a token, certificate, or other identifying information included with the message 152 with a reference included in the account records 156 stored for the respective account in question. For example, if a message 152 purporting to originate from particular electronic device is received at an issuing entity, the issuing entity may determine if an accounts exists which is associated with the respective electronic device, such as by reference to the account records 156. If the account records 156 indicate that an account is in fact authorized for use with the respective electronic device, the appropriate verifying information may be retrieved from the account records 156 and used to authenticate the message 152, such as by verifying a token, certificate, or other piece of information provided with the message 152. If the message is authenticated, the issuing entity may then process (block 158) the message 152.

Figure 11:
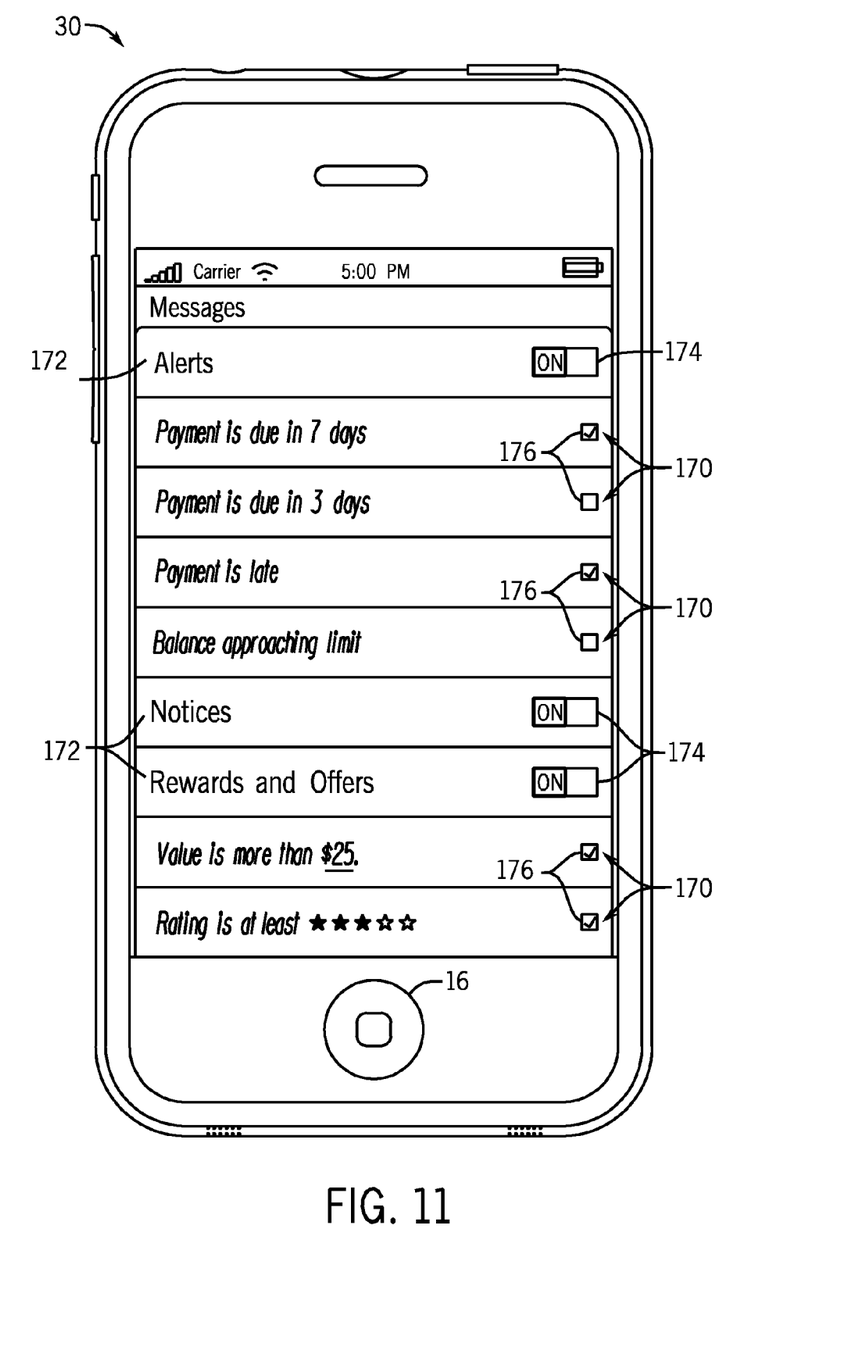
FIG. 11 is a front view of a handheld electronic device displaying message options in accordance with aspects of the present disclosure.

While the preceding describes establishing a trust relationship between two parties and the use of such a relationship in exchanging authenticated messages, in certain embodiments the types of messages exchanged may be determined by selections made on the electronic device storing the account information 62. In one embodiment in which an electronic device (such as a handheld electronic device 30) stores account information 62 a user may specify within the account settings what types of messages he or she wishes to receive. For example, referring to FIG. 8, a user may select an account 134 stored on a handheld electronic device 30 to review or modify account settings related to messages, as depicted in FIG. 11. Turning to FIG. 11, for a selected account 134, options 170 for various categories 172 of messages the user wishes to receive on the handheld device 30 may be displayed.

In one embodiment, a selectable element, such as a virtual slider 174, displayed as part of an application interface may be manipulated by a user to turn on or off different categories 172 of messages, such as the depicted "Alerts", "Notices" and "Rewards and Offers" categories 172. If turned on, a user may receive all of the messages corresponding for that category 172 or may only receive selected options 170 within a category 172. For example, in the depicted embodiment, a category 172 of messages may include multiple messaging options, which may be independently selectable by a user for receipt on the handheld device 30.

Thus, within the Alerts category, a user may select to receive certain alerts related to upcoming or late payments by touching or otherwise selecting the particular options 170 of interest. Selection or non-selection of an option 170 of interest may be signified by respective visual indicators 176, such as the depicted empty circles and check marks. Thus, in the depicted example, the user has selected to receive messages alerting him or her that a payment is due in 7 days or is late, but has not selected to receive messages alerting him or her that a payment is due in 3 days or that a balance limit is being approached.

Likewise, with respect to the Rewards and Offers category, the user has selected to receive messages related to rewards and offers that have values greater than $25 or where the goods or services are rated three stars or higher. In certain embodiments, selection of an option 170 may prompt display of a secondary screen or window that allows the user to enter the threshold value (such as the depicted $25 value or three star rating) that determines which messages will be received. Thus, in these embodiments, the user may specify what categories 172 of messages may be sent to the handheld electronic device 30 for a particular account, what types of messages within each category 172 may be sent, and, for certain message types, certain criteria that the message must meet in order to be sent.

The user selections regarding message preferences made within the account settings on an electronic device (such as handheld electronic device 30) storing account information 62, may be transmitted to the entity maintaining or issuing the respective account. The entity maintaining or issuing the account may update the respective account records such that only the requested messages are sent to the respective electronic device. For example, the selected preferences may themselves be conveyed directly to the entity maintaining or issuing the account based upon the trust relationship established by the initial three-party verification process. In one such embodiment, the preferences themselves may be directly conveyed as a message between the parties, as previously described.

The messages themselves, when sent, may take a variety of forms. For example, in one embodiment the messages may be transmitted as regular, e-mail, text or instant messages in response to the user indicated preferences. In certain embodiments, the trust relationship established via the initial three-party verification process may allow such messages to pass through spam filters or other screening applications that would otherwise screen out such messages. Alternatively, the existing trust relationship may simply provide the user confidence that a message purporting to be from a particular institution is in fact from that institution in view of the established trust relationship. In other embodiments a visual indication (such as check mark, flag, color code, or other visual indication) may be provided with such messages to indicate to a user that the messages are from a trusted source. Alternatively, the authenticated messages may be displayed and/or accessed within an E-Wallet application or with the respective account information stored on the electronic device (as opposed to a regular e-mail, text messaging, or instant messaging application) to confirm the authenticity of the message.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method of communicating between two parties, comprising:
   requesting, by an approving entity prior to communication with a device, an initial authorization from a third party authorization entity;
   receiving, by the approving entity prior to communication with the device, an initial authorization received from the third party authorization entity, the third party identification being based on a third-party identification of the device as being associated with an account holder and a recognition of one or more hardware components of the device;

receiving a message generated by the device after the initial authorization request, wherein the message includes the identification of the at least one hardware component, and wherein the message pertains to an account associated with the account holder; and authenticating the message based upon the initial authorization that the device is authorized to store information related to the account and the identification of the at least one hardware component.

2. The method of claim 1, wherein the message comprises a communication from the account holder associated with the account.

3. The method of claim 1, comprising authorizing the device to store the information related to the account in response to a request received from the third party.

4. A method of communicating between two parties, comprising:

receiving a message on a device, wherein the message pertains to an account;

requesting, by the device, an initial authorization from a third party authorization entity;

receiving, by the device prior to displaying the message, an initial authorization received from the third party entity and based on the third-party authorization entity identifying the account as being associated with a sending entity in which the user of the device has an account, wherein the third party identification is based on a recognition of one or more hardware components of the device by the third party authorization entity;

authenticating the message based upon the initial authorization; and displaying the message if the message is authenticated.

5. The method of claim 4, wherein receiving the message comprises receiving the message directly from the sending entity.

6. The method of claim 4, wherein the sending entity has knowledge that the device is associated with the account.

7. The method of claim 4, wherein the message comprises at least one of an alert, a notice, an offer, or a reward.

8. The method of claim 4, wherein the account comprises one or more of a credit account, a bank account, a debit account, a membership, or a merchant account.

9. The method of claim 4, wherein device comprises a handheld electronic device, a laptop computer, or a desktop computer.

10. A method of communicating between two parties, comprising:

requesting, by a commercial entity prior to communication with a device, an initial authorization from a third party authorization entity;

receiving, by the commercial entity prior to communication with the device, an initial authorization received from the third party entity and based on the third party authorization entity identifying, without commercial entity involvement, the device as being associated with an account administered by the commercial entity, wherein the third-party identification is based on a recognition of one or more hardware components of the device by the third party authorization entity;

generating, after receiving the initial authorization, a message in response to one or more message preferences associated with the account administered by a commercial entity; and transmitting the message from the commercial entity to an electronic device, wherein the commercial entity recognizes the electronic device as storing information about the account and wherein the recognition is based upon one or more hardware components of the device which have been used to identify the device by a third party known to the commercial entity.

11. The method of claim 10, wherein the message comprises an alert, a notice, an offer, or a reward that complies with the one or more message preferences.

12. The method of claim 10, comprising:

receiving a request to store the information about the account on the electronic device from the third party;

transmitting an approval to the request via the third party;

storing a record associating the electronic device and the account such that, in future transactions, the commercial party recognizes the electronic device as storing information about the account.

13. An electronic device, comprising:

a display;

a data storage component storing information about an account;

hardware components that identify the device to a third party authorization entity in communication with a commercial entity that approved the storage of the information about the account on the electronic device;

communication circuitry capable of receiving a message directly from the commercial entity, requesting an initial authorization from a third-party authorization entity, and receiving an initial authorization received from the third party authorization entity and based on the third-party entity identifying, without commercial entity involvement, the account as being associated the device based on a recognition of one or more hardware components of the device by the third party authorization entity; and data processing circuitry capable causing the message to be displayed on the display.

14. The electronic device as recited in claim 13, wherein the information about the account stored on the data storage component comprises an account number or one or more account identifiers that may be used in commercial transactions.

15. The electronic device as recited in claim 13, wherein the communication circuitry comprises one or more circuits capable of receiving the message over a wireless network or a cellular network.

16. The electronic device as recited in claim 13, wherein the data processing circuitry is capable of authenticating the message as being from the third party authorization entity that approved the storage of the information about the account on the electronic device.

* * * * *